United States Patent [19]

Wright

[11] Patent Number: 5,409,831
[45] Date of Patent: Apr. 25, 1995

[54] CONTINUOUS COMPOSTER

[76] Inventor: James Wright, 511 Woodland Acres Crescent R.R. #2, Maple, Ontario, Canada, L6A 1G2

[21] Appl. No.: 17,613

[22] Filed: Feb. 12, 1993

[51] Int. Cl.$^6$ ............................................. C12M 1/00
[52] U.S. Cl. .................... 435/287; 435/313; 435/315; 435/316; 422/184
[58] Field of Search ............. 435/287, 299, 300, 301, 435/310, 313, 315, 316, 813; 422/184; 71/8-10; 34/105, 193, 194, 204, 206, 217, 236, 237; 134/82, 126; 198/710, 717, 721

[56] References Cited

U.S. PATENT DOCUMENTS

| | | | |
|---|---|---|---|
| 1,545,185 | 7/1925 | Hancock | 34/194 |
| 4,326,874 | 4/1982 | Burklin | 422/184 |
| 4,798,802 | 1/1989 | Ryan | 422/184 |
| 5,023,178 | 6/1991 | Schiene et al. | 422/184 |
| 5,049,486 | 9/1991 | Blackwood et al. | 422/184 |

FOREIGN PATENT DOCUMENTS

| | | | |
|---|---|---|---|
| 0056202 | 7/1982 | European Pat. Off. | 435/287 |
| 0145874 | 6/1985 | European Pat. Off. | 435/287 |
| 0209895 | 12/1982 | Japan | 435/287 |
| 0050089 | 3/1984 | Japan | 435/287 |
| 8202737 | 2/1984 | Netherlands | 435/287 |
| 0543667 | 1/1977 | U.S.S.R. | 435/287 |

*Primary Examiner*—William H. Beisner

[57] ABSTRACT

A continuous composter comprises a train of composting in an elongate enclosed tunnel. The trays run on tracks above the level of the base of the tunnel. Garbage enters at one end of the tunnel and compost is removed from the other end. A ram shunts the trays stepwise through the tunnel. The tracks may be U-channels the webs of which are connected to tunnel side walls. The trays rest on one of the U and the other leg of the U extends over the edge of the tray to protect it from being fouled by garbage. Computer control may adjust proportions of aerating gas with recycled gas.

20 Claims, 6 Drawing Sheets

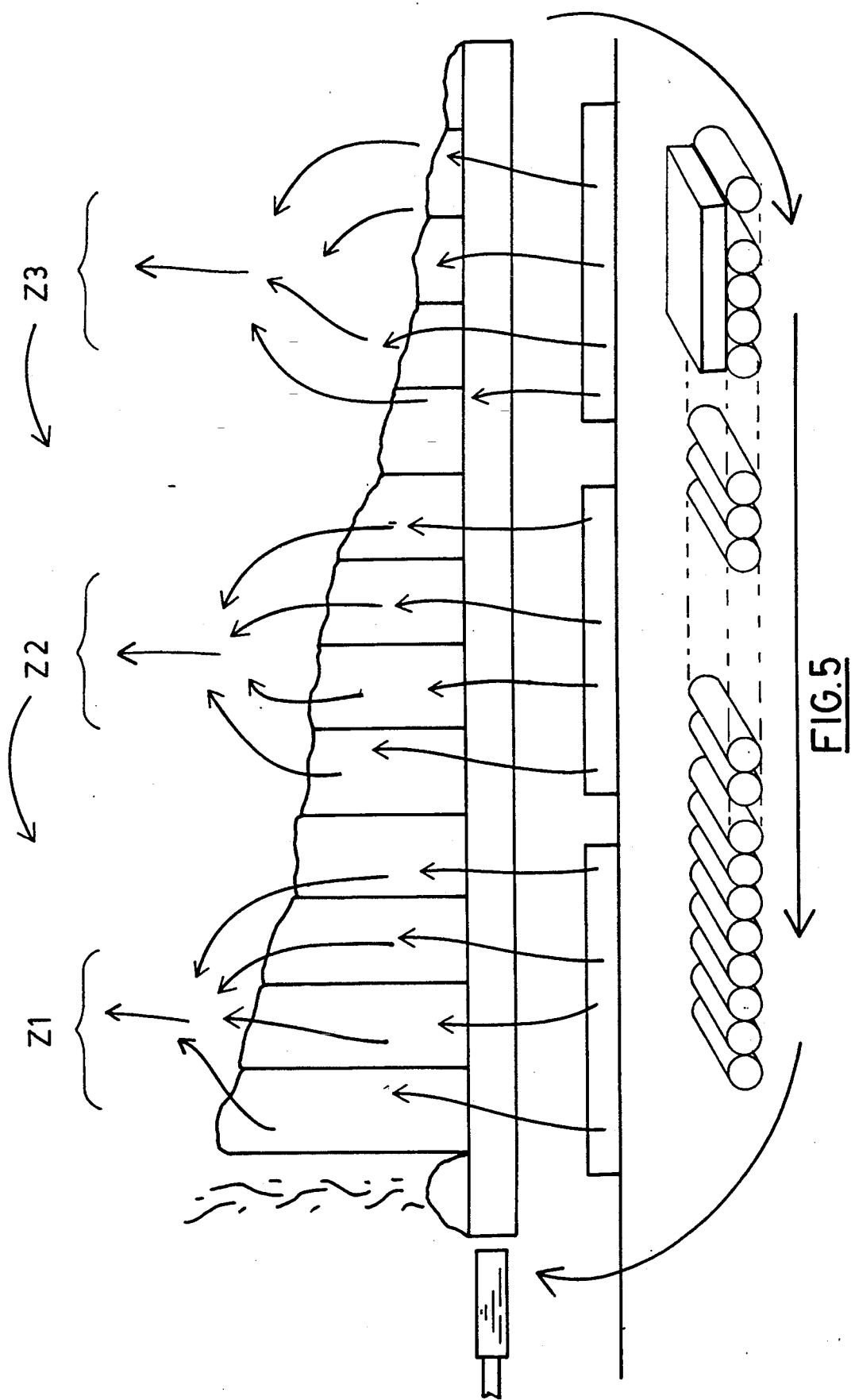

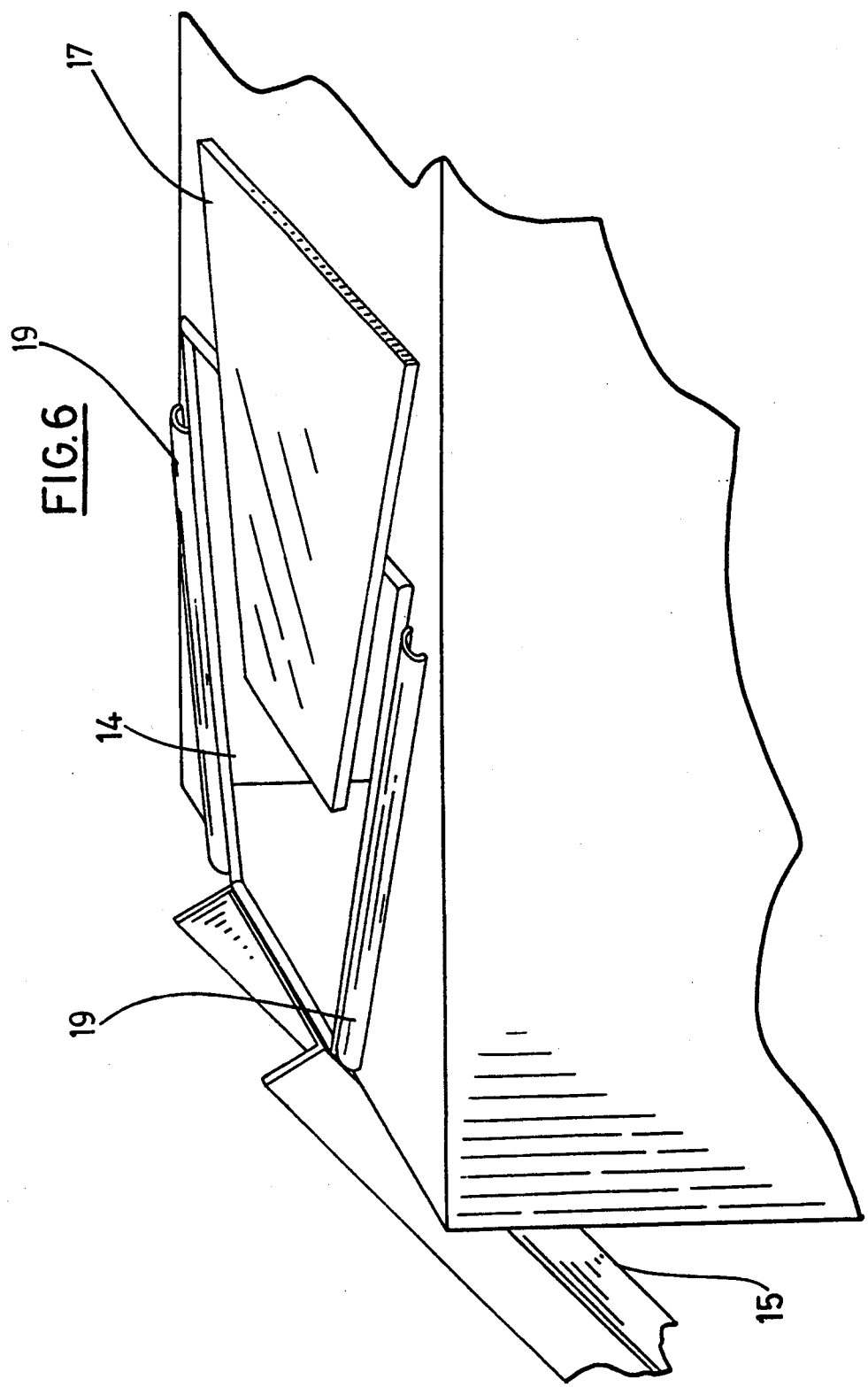

5,409,831

CONTINUOUS COMPOSTER

BACKGROUND OF THE INVENTION

1. Field of the Invention

This invention relates to composters for biodegradable organics.

2. Acknowledgement of Prior Art

At least since environmental considerations have drawn attention to the undesirability of disposing of garbage as landfill, composting has increased in importance. Various industrial and small scale composting systems have been developed to take the place of the traditional back-yard compost heap.

Proposals have been made for continuous composting apparatus into which garbage is loaded at one end and from which compost emerges at another end. Such apparatus, especially large scale apparatus, has met with problems in advancing the garbage through the apparatus.

An example of such apparatus comprises a tunnel having a feed hopper above one end and an exit at the other end. At the feed end a ram is used at intervals to force the composting garbage through the tunnel over a stationary floor. The ram has a tendency to pack the garbage and thus inhibit aeration, which is necessary for successful composting.

Another system of composting which does allow for the necessary aeration involves pulling composting garbage through a tunnel by means of a net. This system, however, is a batch system and it is necessary to complete one batch of compost before starting another.

Frequently, in known composting systems, stench creates a problem. It is not considered desirable for health or aesthetic reasons to use open composting systems since the smells of rotting garbage may give rise to health problems as well as being unpleasant.

Removal and recycling of noxious gases has also provided problems in the past. Tunnel composters such as that described above merely vent the issuing gases.

The present applicant has addressed the problem of providing a continuous composting system suitable for large or small scale use. In particular, he has addressed the problem of providing proper aeration, avoiding compaction of the composting garbage and inhibiting the unpleasant smells associated with composting.

SUMMARY OF THE INVENTION

According to the invention, there is provided a continuous composter comprising: an enclosed elongate tunnel having a first end and a second end; an inlet for garbage in a top surface of the tunnel in the region of the first end; an outlet for compost in the second end; a conveyor track raised from a floor of the tunnel and extending along the length of the tunnel; a train of conveyor trays to travel shuntwise on the conveyor track, each tray having a shunting frame to receive directional shunting force and each tray having a foraminous carrier surface to allow aeration of material in the tray; a ram having a stroke in the direction of an elongate axis of the tunnel, the length of the stroke being equal to a chosen length of shunting step of the conveyor trays, the ram being located to act against the shunting frame of the conveyor tray which is furthest upstream.

The tunnel may have generally parallel sidewalls and the conveyor track may comprise a pair of rails. A mixing hopper may be provided for garbage at the inlet. The mixing hopper may be arranged in said inlet to feed garbage into the conveyor tray which is furthest upstream.

The conveyor trays may be generally rectangular in shape, and have a width between the shunting wall and an opposed wall equal to length of the ram stroke. Conveniently, the conveyor trays are provided with slide runners to bear on the conveyor track. Alternatively the rails may have slide surfaces on which the trays may slide. It is, however, more convenient to provide the surfaces on the trays since they are more easily inspected for wear. The base of the conveyor trays may be perforated metal sheet or mesh or other foraminous material.

Aeration means are suitably provided to feed air into a space between the tunnel floor and conveyor trays located on the conveyor track so that air rises through the bases of the trays and through material located thereon. Exhaust means are provided in a top surface of the tunnel to vent exhaust gases and spent aeration gases from the tunnel.

Surprisingly, it has been found that the recycling of a portion of the exhaust gases and spent aeration gases is not detrimental to the process. Moreover, such recycling may provide a suitable treatment for the unpleasant smelling gases. The proportions of recycled gas and fresh air may be maintained by computer.

Such mixing means may be provided in the tunnel for mixing composting garbage. Such mixing means may comprises mixing rollers extending from side to side of the tunnel and having, for example, paddles for mixing the garbage. The tunnel outlet may be provided with closure means openable by pressure of an advancing conveyor tray such as a freely hinged door.

The invention also includes a method of composting comprising depositing garbage into a composting tunnel through an inlet in a top surface of the tunnel in the region of a first end into a tray located beneath the inlet being the furthest upstream tray of a train of trays on a track running longitudinally within the tunnel;

moving the trays stepwise within the tunnel by operation of a ram against an upstream shunting surface of the furthest upstream tray, each step being equivalent to the width of a tray, whereby space is created upstream of the trays for location of a further upstream tray and a downstream tray is ejected from an outlet in a second end of the tunnel.

BRIEF DESCRIPTION OF THE DRAWINGS

An embodiment of the invention will now be described by way of example with reference to the drawings, in which:

FIG. 5 shows the air flow pattern in the apparatus; and

FIG. 6 shows the nesting of tapered sliding doors.

DETAILED DESCRIPTION OF THE DRAWINGS

Figure 1A:
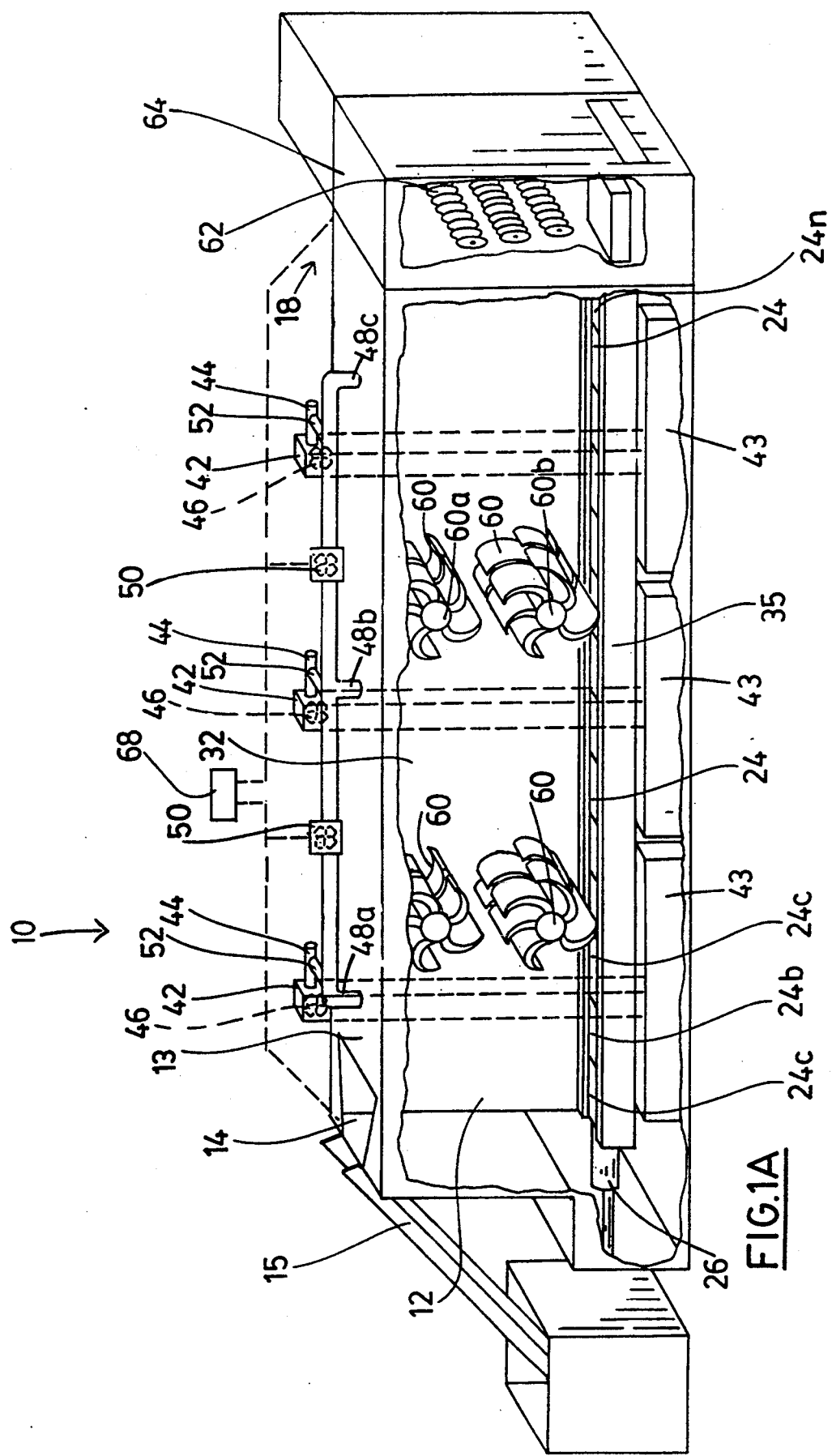
FIGS. 1A and 1B are a schematic illustration of a composter according to the invention.
Figure 1B:
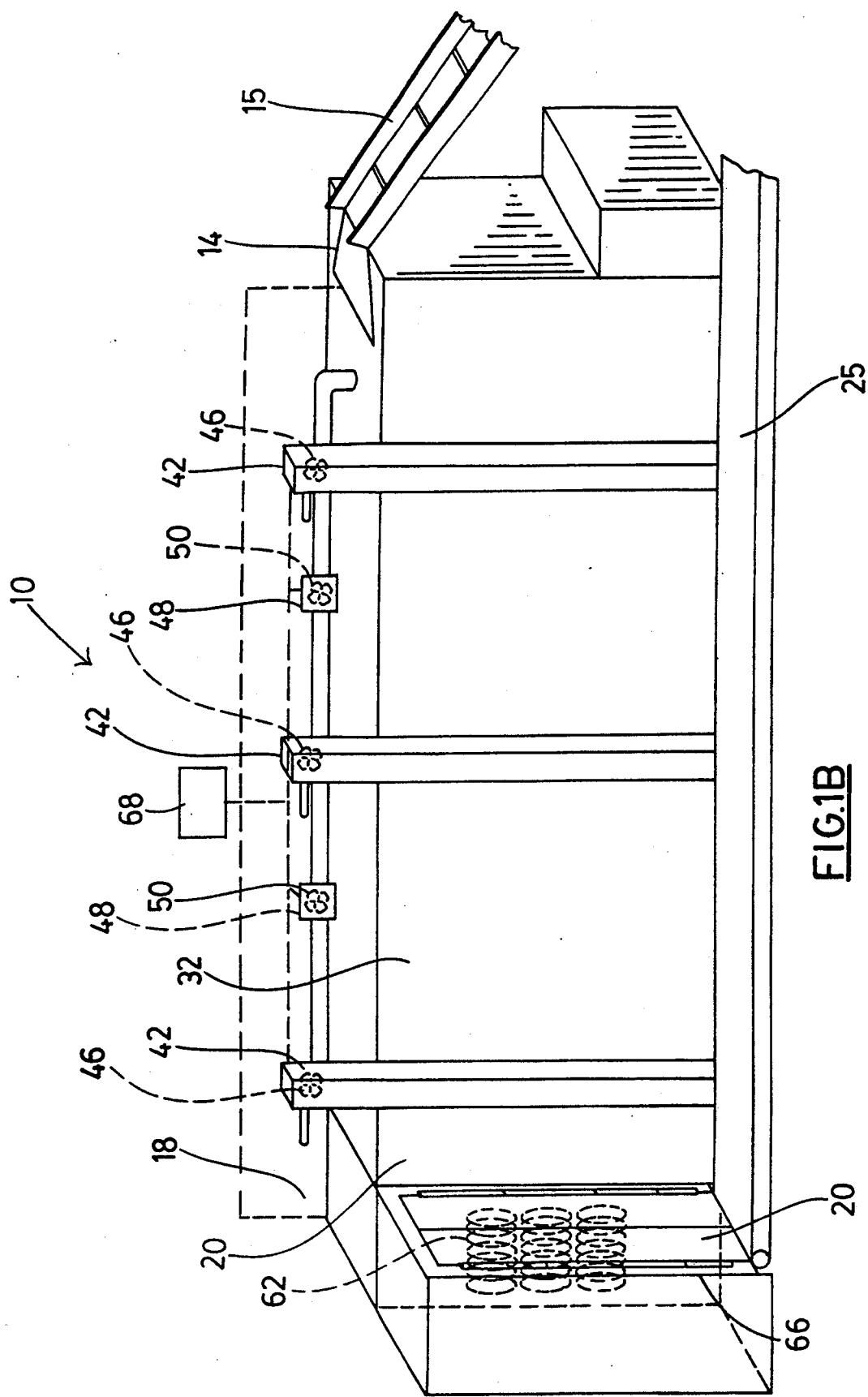
Figure 2:
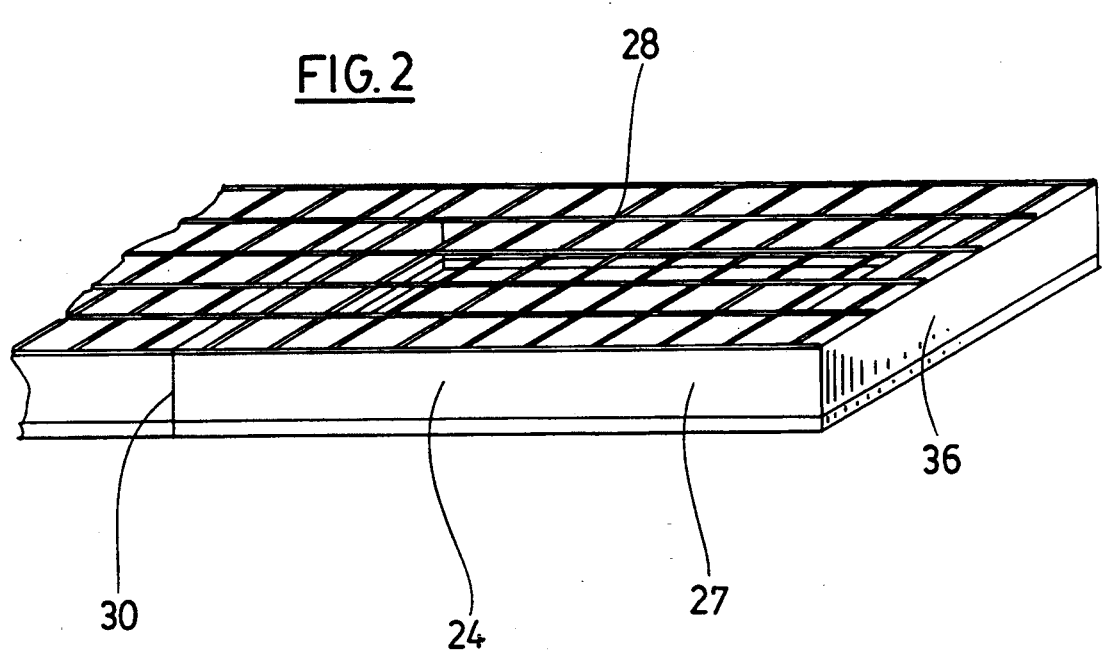
FIG. 2 is an illustration of a movable tray utilizable in a composter such as that of FIG. 1.
Figure 3:
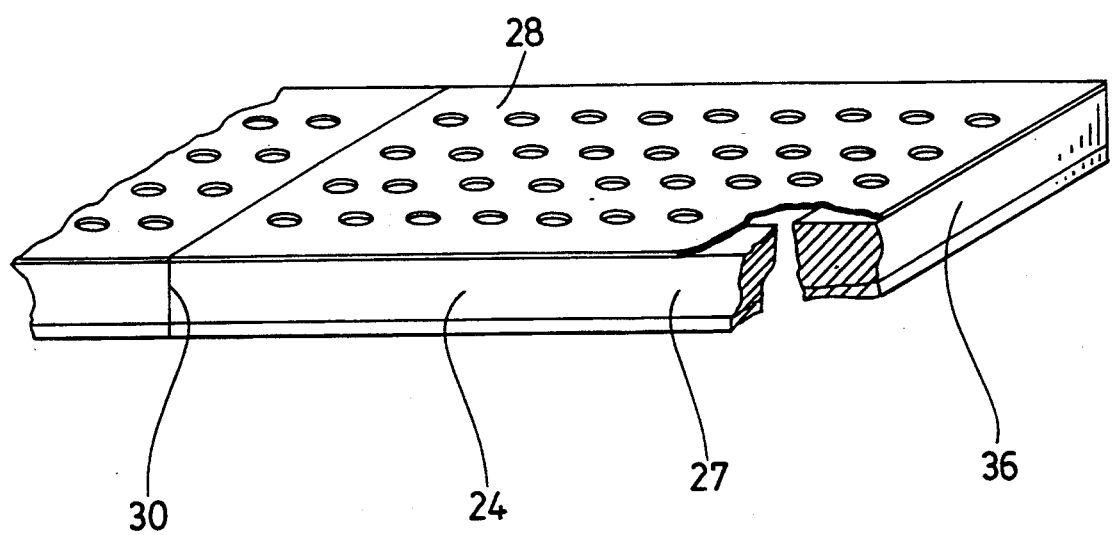
FIG. 3 is an illustration of another movable tray utilizable in a composter such as that of FIG. 1.

The drawings illustrate a composter 10 comprising a tunnel 12 having a top 13 and an input port 14 in an upstream end 16 of top 13. A conveyor 15 lifts garbage to deliver it to input port 14. The downstream end 18 of tunnel 12 has a doorway 20 for outputting compost. Within the tunnel 12, tracks 22 are provided to each side of the tunnel supporting conveyor trays 24a–n. The conveyor trays 24 move stepwise through the tunnel in a longitudinal direction on the conveyor tracks.

Before describing the details of the apparatus it may be useful to describe briefly the operation thereof. A conveyor tray 24a is located on the tracks 22 underneath the mixing hopper 14. Garbage is added from the conveyor 15, through sliding door 17 to a suitable depth in tray 24a, say within a foot of the roof of tunnel 12. The tray 24a is then stepped forward by action of a ram 26 having a stroke sufficient to move tray 24a forward sufficiently to allow space for a further tray 24b. Ram 26 is then withdrawn and tray 24b is inserted between the ram and tray 24a. The number of trays and the length of the tunnel may be such that composting is complete when a tray 24 reaches end 18 of the tunnel. The compost may then be removed from the tray by conveyor 25 and the tray may be returned to the input end. Tray return may be manual or may be automated. When tray return is automated, each tray exiting from a tray exit port 20 may be ejected onto a conveyor to return the tray to the upstream end of the composter 10.

Conveniently, the size of the tunnel and the size of the trays may be such that each tray may take a day's supply of garbage. It is suggested that under good conditions of composting fourteen days will be sufficient to make compost and thus the line of conveyor trays within the composter may be fourteen as shown although other numbers of trays are possible. The operation of the composter will be described in greater detail with reference to the apparatus parts hereinafter.

Sliding door 17 is shown in more detail in FIG. 6. Sliding may be conveniently in an upstream downstream direction in tracks 19 with closing being in the upstream direction. Whatever the direction of operation of door 17 it is found of operation of door 17 it is found convenient to taper it to narrow in the direction of closing. Tracks 19 are correspondingly tapered. As tapered door 17 closes in tapered tracks 19 it nests snugly into the tracks to make a tight seal. Rubber sealing means may also be provided.

Each conveyor tray 24 comprises a frame 27 and foraminous surface 28 through which air can access the garbage to be composted. The foraminous surface 28 is located above frame 27. Trays are added to the train or trays at the upstream end of the tunnel 12 through tray entry port 21. Tray 24a, which is acted upon by ram 26 to advance a step within the tunnel, acts on tray 24b downstream of it to advance tray 24b also. Similarly, tray 24b acts on tray 24c. Thus the trays are shunted down the tunnel until tray 24n is shunted out of tray exit port 20. Since these trays are subject to considerable stresses, initially imparted from ram 26 against the frames 27, these frames 27 are built to withstand these stresses. Sidewalls 30 are of sufficient height to be impacted by the front face of ram 26. Ram 26 conveniently accesses the most upstream frame through tray entry port 21. In practice, it is not necessary that walls 30 should be very high. It is only necessary that they have a vertical area to accommodate the driving face of ram 26 so as to absorb its whole force.

The other pair of tray sidewalls 32 located longitudinally in the tunnel are conveniently made as sturdily sidewalls 30. However, these walls 32 do not have to absorb the full force of the ram against their planes. While considerable crumpling force may be exerted on them in movement of the trays along the tunnel, this force is somewhat mitigated by the presence of garbage in the tray.

The frame 27 comprises two pairs of opposed sidewalls 30, and 32. One pair of these sidewalls 30 extend transversely across the tunnel 12 in upstream and downstream locations. Ram 26 impacts the upstream sidewall 30 directly. Downstream sidewall 30 impacts the next upstream sidewall 30 of tray 24b. Thus, the trays 24 are shunted stepwise in a downstream direction by each stroke of ram 26.

Figure 4:
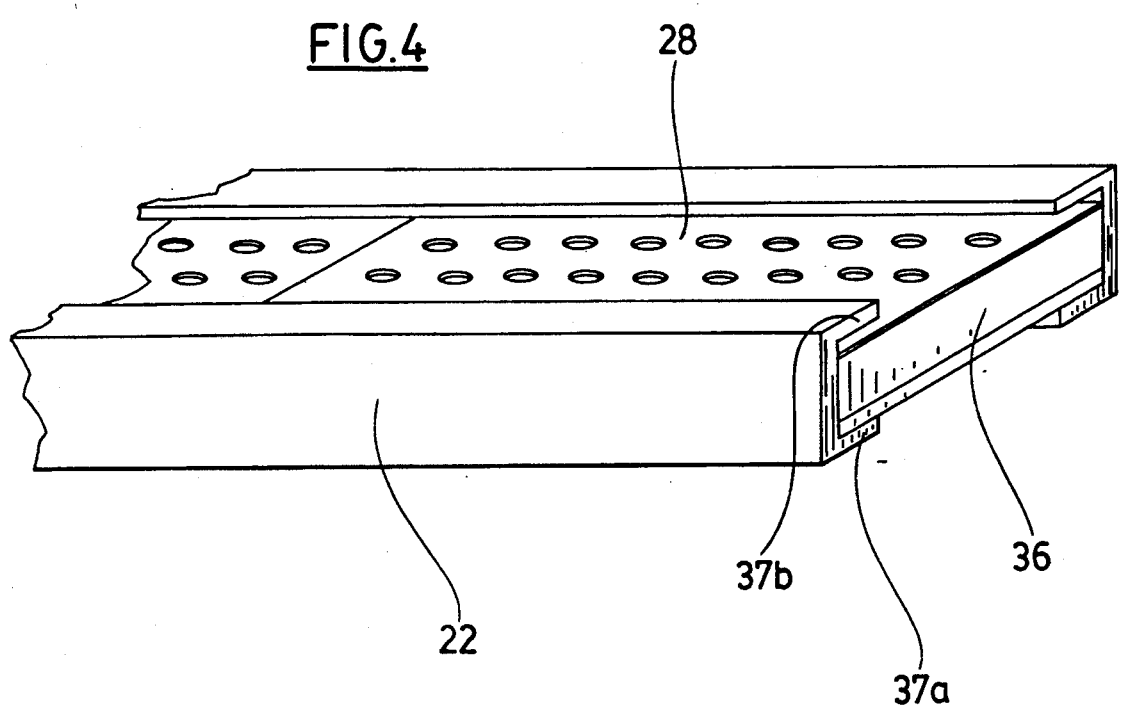
FIG. 4 is a detail showing the movable tray located in a U-channel.

The opposed pair of sidewalls 32 run on tracks 22 carried by the walls 36 of tunnel 12. Conveniently the slides 22 each comprise a U-section channel (see FIG. 4), the web 35 of which is attached to the respective tunnel wall 32. The web 35 of slide 22 is wide enough that the whole height of tray sidewalls 32 may be accommodated within the U-section while resting on carrier U-leg 37a and covered by cover U-leg 37b. The bottom of each tray sidewall 32 may conveniently be provided with a layer of polytetrafluoroethylene or other such material to reduce friction between the trays 24 and the carrier leg 37a of channel 22.

The tunnel 12 and the trays 24 may be sized according to the amount of garbage to be handled. Given that, under good conditions, composting may be achieved within fourteen days, it is convenient to provide one tray per day in the composter. Thus, if 200 pounds of garbage is to be handled per day, the tray size and tunnel size should be such that one tray will accept 200 pounds of garbage. The ram size and ram pressure must clearly also be suitably adjusted to moving the entire train of trays within the tunnel. It is, however, emphasized that a composter according to the invention may be designed for a very small domestic operation or for a very large industrial operation. The mechanics and engineering of tunnels and trays of suitable sizing are well within the scope of a man skilled in the art.

The tunnel 12 is provided with various composting aids along its length. Such as aerators and mixers to loosen and rearrange the garbage. Moreover, means may be provided to recycle at least some of the gases produced during composting, thereby filtering and reducing the total amount of unpleasant, noxious gas.

As illustrated, the tunnel is effectively divided into three zones Z1, Z2 and Z3. An aerator is provided in zone Z1 and again in zones Z2 and Z3. Each aerator comprises a vertical duct 42 extending downwardly outside the tunnel 12 adjacent to sidewall 32. The duct 42 draws air from the exterior through an inlet pipe 44 by means of a fan 46. This air is transported down the duct to below the level of the conveyor trays 24 into a header 43 in the respective zone Z1, Z2, or Z3. From each header 43 the air is distributed through composting garbage in the respective zone. A further fan may be provided at the bottom of the duct 42. Exhaust ducting 48a, b, c is provided at the top of the tunnel in each zone for the removal of the air and gases produced during composting. Exhaust fans 50 may be located in the exhaust ducting. Surprisingly, it has been found that the addition of a proportion of the exhaust gases to the aerating gas passed down duct 42 is beneficial to the composting process. The exhaust gases contain an appreciable amount of unused oxygen, and it is possible that, apart from the addition of oxygen, one affect of recycling the exhaust gases is to enhance the lightening effect of the aeration and to help prevention and compaction of the garbage. Another important benefit of using recycled exhaust gases through branch tube 52 is that the exhaust gases are heated due to the bacterial action in the garbage. In zone 1 where the garbage is fresh and cool, it is possible to use aerating gas which may be as much as 100% recycled exhaust gas. This may help to heat up the garbage to optimum composting temperature. As soon as bacterial action is substantial, the composting garbage is warm and it may be beneficial to use as much as 100% cool, fresh air to maintain the temperature of the composting process at its optimum.

Of course, a varying number of zones may be used in apparatus according to the invention, and the description relating to three zones is exemplary only.

As the compost in trays 24 travels along the tunnel 12 it may tend to settle slightly. Moreover, composting may not be even throughout the heap of garbage on each tray. It is, therefore, desirable to mix the material in order to loosen it, aerate it, mix it, and generally improve composting conditions. For this purpose, mixing rollers 60 may be provided extending across the tunnel 12. These mixing rollers 60 may extend from sidewall to sidewall of the tunnel 12 and may have drive shafts extending through the side of the tunnel to be powered by any convenient means (not shown). As illustrated, two mixing rollers, 60a and 60b are provided one above the other, in the end region of zone Z1, and in the end region of zone Z2. However, it will be appreciated that mixing rollers can be provided at whatever distances along the tunnel are thought suitable.

The mixing rollers may be of any suitable form and, indeed, need not be rollers but may be any device to mix the compost. As illustrated, the rollers 60 are provided with paddles to catch and circulate the garbage. The mixing rollers 60 may rotate on drive shafts in similar or opposed directions.

At the end of zone Z3, three augers 62 are provided one above the other to transport the formed compost into a side tunnel annex 64. In annex 64 the compost delivered from the augers 62 falls onto a conveyor 25 and is removed through sliding door 66.

The whole process may be subject to computer control by computer 68. Computer 68 calculates and controls the proportions of exhaust gas and fresh aerating gas delivered into each of the zones Z1, Z2 and Z3, and may also control opening and closing of sliding doors 17 and 66. Generally, sliding doors 17 and 66 are only permitted to open when conveyors 15 and 25 respectively are in operation. At all other times, the tunnel is effectively completely sealed. An entry is provided for the trays 24 and an exit port 20 is also provided; but, when trays 24 are in position within the tunnel 12, the frames effectively block and close the entry and exit ports for the trays. The computer 68 may also ensure that the pressure of aerating gas, with or without an exhaust gas component, is maintained lower than the suction pressure removing exhaust gas. If the pressure within the tunnel is maintained less than the atmospheric pressure, any leaks in the system will not result in the escape of noxious odours.

As the trays progress stepwise through the tunnel the volume of composting garbage decreases. Thus, tray 24a is loaded to within, perhaps, one foot of the roof of tunnel 12. This volume may have decreased to 40% of the original by the time the tray has reached the position of tray 24n. It may be possible by use of the mixers, or by use of additional augers acting longitudinally, to provide some mixing of material from tray to tray without detriment to the composting process. Such mixing may help to move material to maintain a more even level in the tunnel. At least, additional mixing may provide greater aeration and lift and hasten composting in the downstream trays.

The longitudinal and volume dimensions of the tunnel are purely a matter of choice. It is for convenience that the system has been described with reference to a tunnel of length to accommodate fourteen trays, one tray being utilized for each day's garbage. If a regular supply of garbage is available, this system is of convenience to the operator irrespective of the amount of garbage being delivered per day. Thus, if an operator can rely on say, 200 pounds of garbage per day, the system may be designed so that each tray will accommodate 200 pounds of garbage. In such a system there is little need to check whether a tray is being overloaded and whether it is time to install a new tray. It will, however, be appreciated that when the supply of garbage is irregular there will be a need to advance the train of trays only when the tray 24a directly under the hopper 14 is filled to a suitable capacity. The decision as to when this point occurs may be made by visual inspection, or other automated means may be installed to warn the operator that a step forward of the tray train is desirable.

Again, the choice of fourteen days (or fourteen trays) as the length of the tunnel is by no means limiting. Under good conditions compost may be made in fourteen days, but given suitable strength of trays and suitable force of the ram there is no objection to compost remaining in the tunnel for a greater length of time. This will, of course, extend the length of the tunnel beyond that minimally necessary.

I claim:

1. A continuous composter comprising:
    an enclosed elongate tunnel having an upstream end and a downstream end;
    an inlet for garbage in a top surface of the tunnel in an upstream end region;
    an outlet for compost in the downstream end;
    rails raised from a floor of the tunnel and extending along the length of the tunnel;
    a plurality of generally rectangular conveyor trays each having a shunting wall and an opposed wall to slide shuntwise on the rails from the upstream end to the downstream end, each tray having at least one shunting frame to receive shunting force and each tray having a foraminous carrier surface;
    a ram to provide directional shunting force, the ram having a stroke from the upstream end towards the downstream end of the tunnel, the length of the stroke being equal to the width of the conveyor tray between the shunting wall and the opposed wall, the ram being located to act against the shunting wall of the conveyor tray which is furthest upstream.

2. A continuous composter as claimed in claim 1 in which the tunnel has generally parallel sidewalls and the rails are a pair of rails each of which is located towards one tunnel sidewall.

3. A continuous composter as claimed in claim 2 in which the rails comprise U-channels each connected to a sidewall through its web and each U-channel having a carrier leg carrying the trays and one leg extending over a side edge of the frames of the trays.

4. A continuous composter as claimed in claim 3 in which a layer of polytetrafluoroethylene is provided between a bottom of each tray and the carrier leg.

5. A continuous composter as claimed in claim 4 in which the polytetrafluoroethylene layer is attached to the bottom of each tray.

6. A continuous composter as claimed in claim 1 in which said inlet is provided with a sliding door.

7. A continuous composter as claimed in claim 6 in which the sliding door is tapered to narrow in the direction of closing and runs in a correspondingly tapered track to feed garbage into the conveyor tray which is furthest upstream.

8. A continuous composter as claimed in claim 7 in which a seal is provided for the door.

9. A continuous composter as claimed in claim 1 in which a conveyor is provided to return conveyor trays from the downstream end to the upstream end.

10. A continuous composter as claimed in claim 1 in which the foraminous carrier surface of the conveyor trays are perforated metal sheet.

11. A continuous composter as claimed in claim 1 in which the foraminous carrier surface of the conveyor trays comprise wire mesh.

12. A continuous composter as claimed in claim 1 in which aeration means are provided to feed air into a space between the tunnel floor and the conveyor trays located on the rails.

13. A continuous composter as claimed in claim 12 in which exhaust means are provided in a top surface of the tunnel to vent exhaust gases and spent aeration gases from the tunnel.

14. A continuous composter as claimed in claim 13 in which the exhaust means includes to recycle a portion of the exhaust gases and spent aeration gases to said aeration means.

15. A continuous composter as claimed in claim 11 in which computer means are provided to monitor the ratio of exhausted gases and spent aeration gas to fresh aeration gas.

16. A continuous composter as claimed in claim 1 in which mixing means are provided in the tunnel for mixing garbage positioned on the trays.

17. A continuous composter as claimed in claim 16 in which the mixing means comprise mixing rollers extending between sidewalls of the tunnel.

18. A continuous composter as claimed in claim 17 in which the mixing rollers are provided with mixing paddles.

19. A continuous composter as claimed in claim 1 in which augers are provided in a downstream end region of the tunnel to transport composted material therefrom.

20. A continuous composter as claimed in claim 1 in which fourteen conveyor trays are provided.

* * * * *